United States Patent
Venkataramanan et al.

(10) Patent No.: US 8,837,322 B2
(45) Date of Patent: Sep. 16, 2014

(54) METHOD AND APPARATUS FOR SNOOP-AND-LEARN INTELLIGENCE IN DATA PLANE

(75) Inventors: Subhashini A. Venkataramanan, Fremont, CA (US); Srinivasa R. Addepalli, San Jose, CA (US)

(73) Assignee: Freescale Semiconductor, Inc., Austin, TX (US)

( * ) Notice: Subject to any disclaimer, the term of this patent is extended or adjusted under 35 U.S.C. 154(b) by 529 days.

(21) Appl. No.: 13/164,009

(22) Filed: Jun. 20, 2011

(65) Prior Publication Data

US 2012/0320788 A1    Dec. 20, 2012

(51) Int. Cl.
- *H04L 12/26* (2006.01)
- *H04L 12/833* (2013.01)
- *H04L 12/54* (2013.01)
- *H04L 12/851* (2013.01)

(52) U.S. Cl.
CPC ............ *H04L 47/2458* (2013.01); *H04L 47/31* (2013.01); *H04L 12/569* (2013.01); *H04L 12/56* (2013.01); *H04L 47/2441* (2013.01)
USPC ........................................................ 370/253

(58) Field of Classification Search
USPC ........................................................ 370/253
See application file for complete search history.

(56) References Cited

U.S. PATENT DOCUMENTS

| | | | |
|---|---|---|---|
| 7,272,139 B2 | 9/2007 | Fitzpatrick et al. | 370/392 |
| 8,005,012 B1 * | 8/2011 | Aybay et al. | 370/253 |
| 2009/0086651 A1 * | 4/2009 | Luft et al. | 370/253 |

* cited by examiner

*Primary Examiner* — Ayaz Sheikh
*Assistant Examiner* — Blanche Wong
(74) *Attorney, Agent, or Firm* — VanLeeuwen & VanLeeuwen; Jonathan N. Geld

(57) ABSTRACT

An approach is provided where incoming packets are received at a data plane and header fields are extracted from the incoming packet. Flows from a flow data store are matched with the extracted header fields from the incoming packet. Packet descriptor data associated with the incoming packet is marked in the selected incoming packet forming a marked ingress packet with marking performed when the matching fails. The marked ingress packet is forwarded to a control plane that retrieves flow-related data related to the marked ingress packet and updates the marked packet descriptor data using the retrieved flow-related data, thereby forming an updated marked packet. The control plane passes the updated marked packet back to the data plane for further processing to update the flow data stored in the flow data store.

20 Claims, 7 Drawing Sheets

METHOD AND APPARATUS FOR SNOOP-AND-LEARN INTELLIGENCE IN DATA PLANE

TECHNICAL FIELD

This innovation relates to generally to network infrastructure elements and more specifically to network infrastructure devices that have control plane (normal path) and data plane (fastpath) architectures.

BACKGROUND

A computer network domain consists of multiple networks with each network consisting multiple personal computers, servers, mobile devices and laptops. Network infrastructure devices such as switches, routers in the network are used to connect different kinds of computers within each network and also to connect networks together. In addition to connectivity related network infrastructure devices, there are different types of network infrastructure devices. Some of these network devices include 'Network security devices' that are used to protect the network resources from computer attacks, malware and viruses, toad balancing devices' that are used to distribute the traffic across multiple computer servers and network edge devices which do network address translation while connecting to the Internet. These devices process the TCP/IP traffic based on its functionality. To improve the speed of the packet processing, the processing is divided into two planes—Control plane and Data plane. Control plane processes the new TCP/IP connection by processing the first packet. Further packets of the connection are processed by Data plane. Traditionally, control plane, as part of the first packet processing, creates the connection and synchronizes the flow with the Data plane so that Data plane processes further packets of that flow without sending them to control plane. Since control plane requires access to user defined policy rules, traditionally it is implemented in general purpose processors. Since data plane requires to process large number of packets, data planes are normally implemented in FPGA, ASIC, dedicated processor or sometimes in the same processor as control plane as a high priority process.

Network infrastructure devices based on its function create the flows by referring to user defined rules. The Control plane, once it determines the flow can be offloaded to data plane, sends the flow information to the data plane by sending command to the data plane. Data plane maintains the flows in its table and processes further incoming packets by matching to the right flow, make updates to the packet as per the flow information and send the packet out without sending the packets to control plane. Packets which do not match to any existing flow would normally sent to the control plane. When the flow is no longer required, control plane deletes the flow from its local memory and sends a 'Delete' command to the data plane to remove the flow from data plane. Control plane has multiple mechanisms to determine the flow is no longer required, one popular mechanism being inactivity on the flow. If there are no packets seen on a flow for a certain period of time, flow is considered inactive and the flow is removed from both control plane and data plane. Since the control plane does not see the packets of the flow once the flow is created in data plane, the control plane might mistakenly delete the flow by falsely determining that there is inactivity on the flow. To ensure that the flow is not deleted prematurely, control plane applications periodically query the data plane for each flow to find out whether there is any activity on the flows. For simple applications implemented in Control Plane/Data Plane model, three commands are traditionally used—Create flow, Delete flow and Query flow. As an example, Network security devices such as firewall creates the flow upon first packet when the access rules permit the traffic. Control plane, upon creating the flow, sends a command to data plane to create the flow. Then onwards, any packets that have come into the system, data plane processes the packets without sending them to control plane. Data plane maintains the timestamp of the last packet in its flow. Control plane queries (by sending query command) the data plane to get the last packet's timestamp and uses this information on whether to keep the flow or delete the flow. If inactivity is determined, the control plane sends the 'delete' command to delete the flow in Data plane in addition to deleting the flow from its own table.

Packet processing by Data plane uses not only application specific information from the flow, it also uses information to route the packet out. After modifying the packet as per the flow information, it uses egress port information and the L2 header to be put in the packet for packets to get routed to the right network element in egress network. Hence, Control plane not only creates the flow for specific application such as firewall, Load balancing, Network Address Translation, but it also pushes information related to the L2 header. Since the L2 header information might change during the life of flow and also since the L2 header information may be same for multiple flows, L2 header information is traditionally pushed to the data plane using separate commands such as Create L2 Header, Modify L2 Header, and Delete L2 Header. As known by those skilled in the art, The Data Link Layer is Layer 2 (L2) of the seven-layer OSI model of computer networking. It corresponds to, or is part of the link layer of the TCP/IP reference model.

Network devices connect to networks using multiple L2 protocols—Ethernet, PPPoE, PPTP, L2TP, Frame Relay, MPLS and many more. Each L2 protocol is itself is a complex protocol. To enable synchronization of L2 header information to the Data plane requires modification of multiple L2 protocol stacks in the control plane. This can become very complex for multiple reasons, a primary reason being the complexity in modifying every L2 protocol stack.

As part of first packet processing, different modules of the Control plane pushes the state information (flow, L2 header information) to the Data plane. Traditionally, the Control plane ensures that the multiple states required for packet processing are created atomically in the data plane so that data plane processing can occur smoothly. However, using traditional techniques to synchronize the multiple states is complex and challenging, which may lead to errors in the data.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
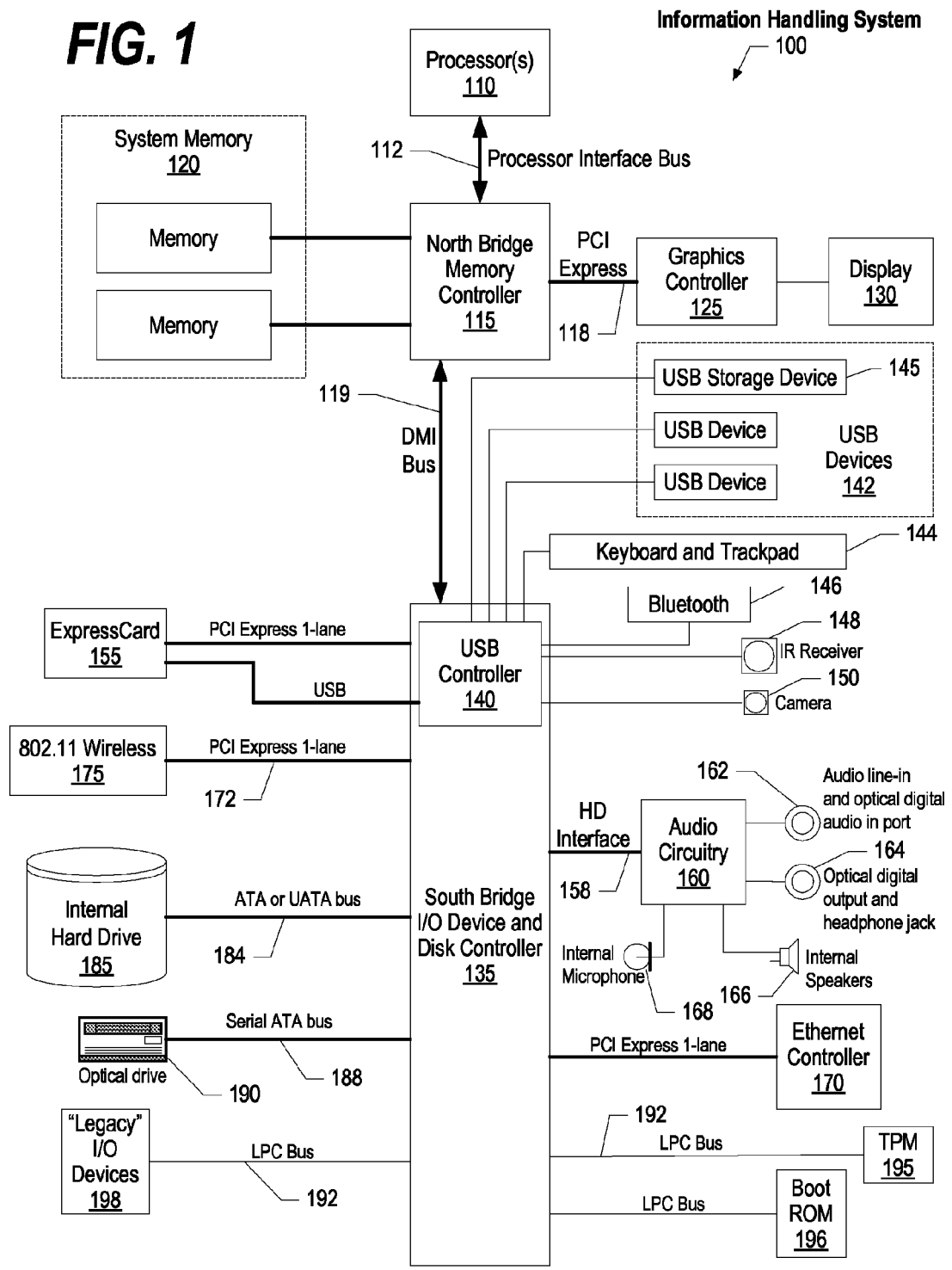
FIG. 1 is a block diagram of a data processing system in which the methods described herein can be implemented.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language, assembly language or similar programming languages. The program code may execute entirely on the, standalone network appliance, computer Server, as add-on card to Servers, across multiple computer systems, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processors, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will, as set forth above, further explain and expand the definitions of the various aspects and embodiments of the invention as necessary. To this end, this detailed description first sets forth an embodiment of a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
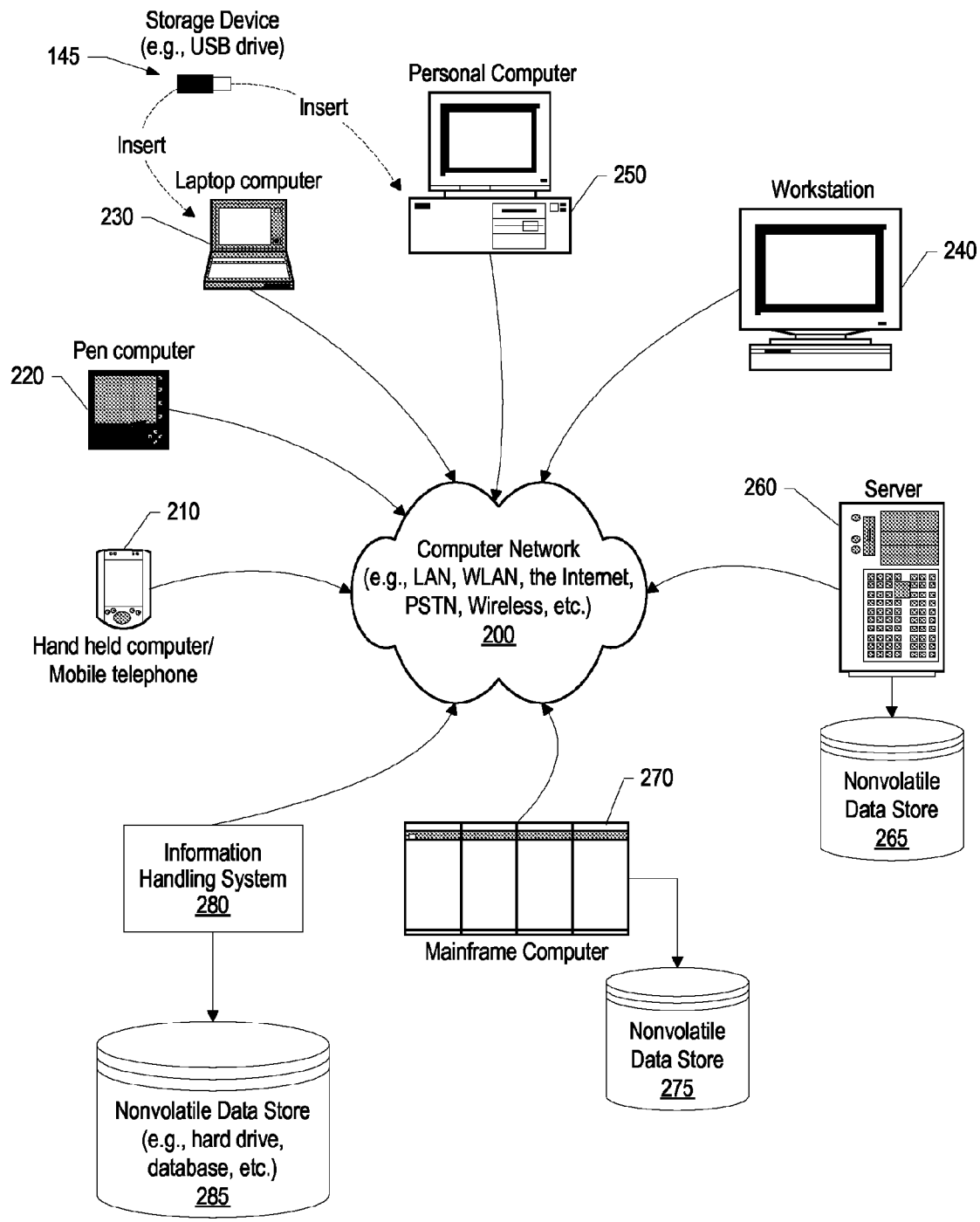
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH).

Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
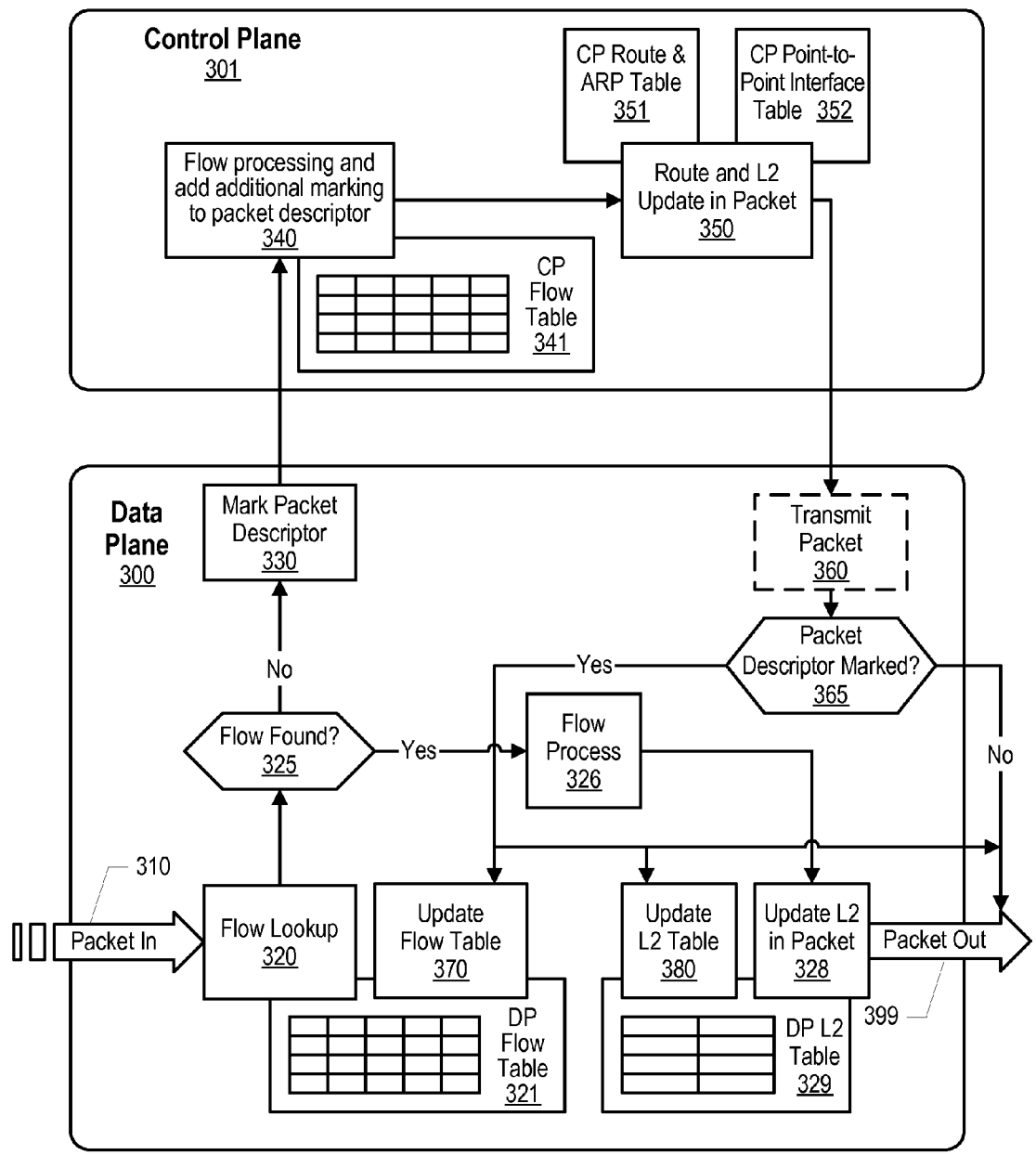
FIG. 3 is a diagram depicting interaction between a data plane and a control plan in a first embodiment.

FIG. 3 is a diagram depicting interaction between a data plane and a control plan in a first embodiment. Two planes, data plane 300 and control plane 301, work together to process incoming packet 310. Data plane 300, also known as the forwarding plane or fastpath plane, defines the part of the system (e.g., a router architecture, a data switch architecture, network appliance architecture, etc.) that determines what to do with multiple incoming packets, including incoming packet 310. The planes can be implemented in software, hardware or a combination. For example, one of the planes (e.g., the data plane) can be implemented in hardware while the other plane (e.g., the control plane) can be implemented in software.

Control plane and Data plane separation in networking applications is used to improve throughput performance of applications. The control plane establishes the flows with packet processing information in the data plane and the data plane processes further packets belonging to that flow by itself thereafter. Typical packet flow involves data plane receiving the packet, searching for the matching flow, acting on the packet based on flow information and routing the packet out. The data plane traditionally sends the packets with no matching flow to the control plane. Traditionally, the control plane establishes the flows, routing information, L2 header information using command/response mechanisms before sending the received packet. There are multiple issues associated with command/response mechanism such as race condition between the packets and the commands/responses, significant changes to the control plane software and changes to multiple control plane modules. The approach shown in FIGS. 3 through 7 is used to eliminate the above mentioned challenges found in the traditional implementations. In some networking flow applications such as IP forwarding, firewall, DNS and Network Address Translation applications, the disclosed approach eliminates/minimizes the need for any changes to the flow processing modules in the control plane. In this approach, the data plane marks the packet descriptor before handing over the packet to the control plane. Control plane updates the packet as normally done by the control plane, and additionally may add some more flow specific data to the packet descriptor. Data plane snoops the packets at the control plane to data plane interface point, discovers the flow and L2 header information from the packet descriptor, packet, and populates its internal tables.

Disclosed are techniques whereby command/responses between the Control plane and Data plane are reduced or eliminated. This technique also avoids or minimizes making changes by developers in L2 stacks. This technique reduces the complexity of the system, increases robustness of the system and improves the overall performance of the system. This takes advantage of the fact that the Data plane owns the network ports and hence the one which receives the packets into the system and once which sends out the packets from the system onto the network ports.

As disclosed, provided is a technique of 'marking' the incoming packets that are being given to the control plane, adding additional marking of the packet by the control plane application, snooping of the packet that is being given to the Data plane for transmission and managing the flow and L2 tables in the Data plane. This innovation also includes a mechanism at the Data plane to determine the changes to the flow and L2 Table information and deletion by Data plane of flows.

Flow lookup processing 320 is used to find a matching flow entry based on previously recorded information (e.g., five-tuple information based TCP/IP connections, etc.). In one example of embodiment, flow table 321 is searched by flow lookup 320 with five-tuple information that describe each bidirectional connection (e.g., TCP, UDP connections, etc.). The five-tuple data is unique for each connection to allow data to go to and from the right devices. In this example embodiment, the five-tuple includes five pieces of information of the TCP/IP packets that include the protocol type, the local address, the local port, the remote address, and the remote port.

A decision is made as to whether a flow entry was found in flow table 321 that matches incoming packet 310 (decision 325). If a flow entry was found in flow table 321 that matches the incoming packet, then decision 325 branches to the "yes" branch whereupon flow process 326 is performed by the data plane. Flow process 326 processes the incoming packet as per the information in the matching flow entry that was found in flow table 321. At step 328, the required L2 header information is written to the packet and then outgoing packet 399 is transmitted out to the destination over a communications network (e.g., the Internet, etc.).

On the other hand, if a flow entry was not found in flow table 321, then decision 325 branches to the "no" branch whereupon, at step 330, the packet is marked and sent to control plane 301 for further processing. In one embodiment, mark packet processing 330 inserts command data into the packet descriptor that is associated with the incoming packet. The marked packet is referred to as a marked ingress packet.

Control plane 301 receives the marked ingress packet and performs control plane processing at 340 such as Firewall policy lookup, Network Address Translation rule lookup etc., modifies the packet as per the matching policy & rules such as translating the IP and TCP/UDP header fields, and also adds additional marking information to the packet descriptor of marked ingress packet. The processing performed is, in one embodiment, based upon the command data inserted in the marked ingress packet. At 350, the control plane inserts state data into the packet forming a marked egress packet. In one embodiment, the control plane inserts state data by updating the L2 header of the packet based on the interface on which the packet is to be transmitted. Control plane 301 then sends the marked egress packet back to data plane 300 for transmission.

Transmit function 360 identifies whether the packet is marked. A decision is made as to whether the packet received for transmission is marked (decision 365). If the packet is marked (a marked egress packet is being processed), then decision 365 branches to the "yes" branch whereupon processes 370 and 380 are performed. At process 370, the flow entry information is learned from the packet descriptor, packet content information and an entry is created or updated in flow table 321. At process 380, the L2 header data is also learned from the marked egress packet's state information and is used to update L2 Table 329. The packet descriptor is removed from the packet forming egress packet 399 that is transmitted out to the destination over a communication network (e.g., the Internet, etc.). On the other hand, if the packet being processed by the data plane is not a marked packet, then decision 365 branches to the "no" branch whereupon outgoing packet 399 is transmitted to the destination over the communications network without the need to update the flow table or the L2 Table.

As described above, and in further detail below, the embodiments of the disclosed technique avoids command and response message between the Control Plane and the Data Plane for the purposes of managing flow and L2 Tables in the Data plane. This technique also simplifies the complexity of Control plane and Data plane separation in networking applications such as Firewall, Network Address Translation. In addition, this technique enables the Data Plane to attach additional information to the incoming packet that is being sent to the Control Plane. The Control Plane may add additional packet flow information to the packet descriptor as needed. As the packet traverses through the Control Plane routing and L2 protocol stack modules, L2 header information is also added to the packet. This technique enables the Data Plane to snoop the resulting packets it receives from the Control Plane, and enable the Data Plane to create and update internal flow and L2 tables from the marked information in the packet descriptor and from the packet contents. Further incoming packets received from the network that match the internal flow are processed by the Data Plane itself using information present in the flow data store. As will be explained in further detail in FIG. 7 and corresponding text, this technique also generates dummy packets and sends them to the Control Plane on a periodic basis to identify changes to internal tables maintained by the Data Plane. In this manner, the data stored in the Data Plane tables are kept up-to-date with the data stored in the Control Plane tables.

Figure 4:
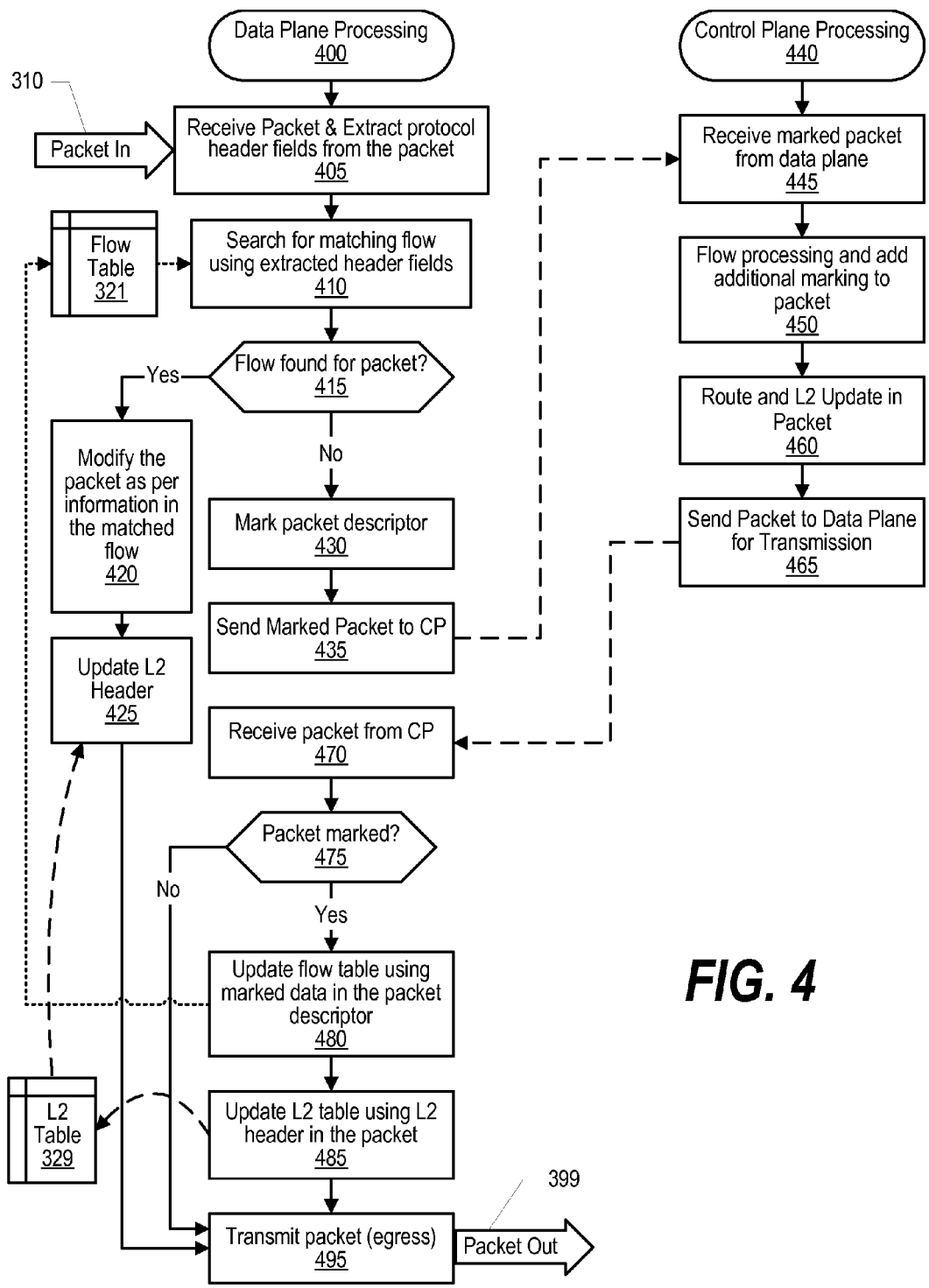
FIG. 4 is a flowchart showing steps performed by the data plane and the control plane in the first embodiment.

FIG. 4 is a flowchart showing steps performed by the data plane and the control plane in the first embodiment. FIG. 4 depicts in a flowchart representation the processes shown in FIG. 3. Data plane processing commences at 400 whereupon, at step 405, a number of packets, including packet 310, are received at the data plane. Data Plane extracts the fields of interest at step 405. In one example of embodiment, the fields of interest are 5-tuples including source IP address, Destination IP address, IP protocol from IP header AND source port and destination port from TCP or UDP header. At step 410, the data plane performs a flow lookup to find a matching flow entry in flow table 321. In one embodiment, the flow lookup is performed based on the five-tuple information discussed in FIG. 3.

A decision is made as to whether a flow table entry was found in flow table 321 that corresponds to incoming packet 310 (decision 415). If a flow table entry was found, then decision 415 branches to the "yes" branch whereupon, at step 420, the flow is processed by post flow lookup processing according to the entry that was found in the flow table and, at step 425, the L2 header data in the packet is updated by inserting ("snapping") required L2 header data to the packet, before the packet is transmitted out (egress) to a destination over a communications network (e.g., the Internet, etc.).

Returning to decision 415, if a flow table entry was not found in flow table 321 that corresponds to incoming packet 310, then decision 415 branches to the "no" branch to process the packet. At step 430, the incoming packet is marked. In one embodiment, the marking includes inserting command data in the packet descriptor associated with the incoming packet thereby forming a marked ingress packet. At step 435, the marked ingress packet is forwarded to the control plane for further processing.

Control plane processing is shown commencing at 440 whereupon, at step 445, the marked ingress packet is received from the data plane. At step 450, the control plane processes the marked ingress packet and performs the necessary modification to the packet and may add additional state data to the packet descriptor. At step 460, the control plane also updates the L2 header data of the marked ingress packet based on the interface on which the packet is to be transmitted At step 465, the marked egress packet is sent back to the data plane for further processing and transmission.

Continuing data plane processing, at step 470, the data plane receives the marked egress packet (with state data inserted therein) from the control plane. A decision is made as to whether the packet received from the control plane has been marked (decision 475). If the packet has been marked (indicating a marked egress packet), then decision 475 branches to the "yes" branch whereupon, at step 480, flow table 321 is updated using the state data in the packet descrip-tor and packet data included in the marked egress packet. At step 485, L2 table 329 is updated based on the state data inserted in the marked egress packet by the control plane. In addition, during step 485 the packet descriptor is removed from the marked egress packet forming egress packet 399 that, at step 495, is transmitted out to the destination network element over a communications network (e.g., the Internet, etc.).

Figure 5:
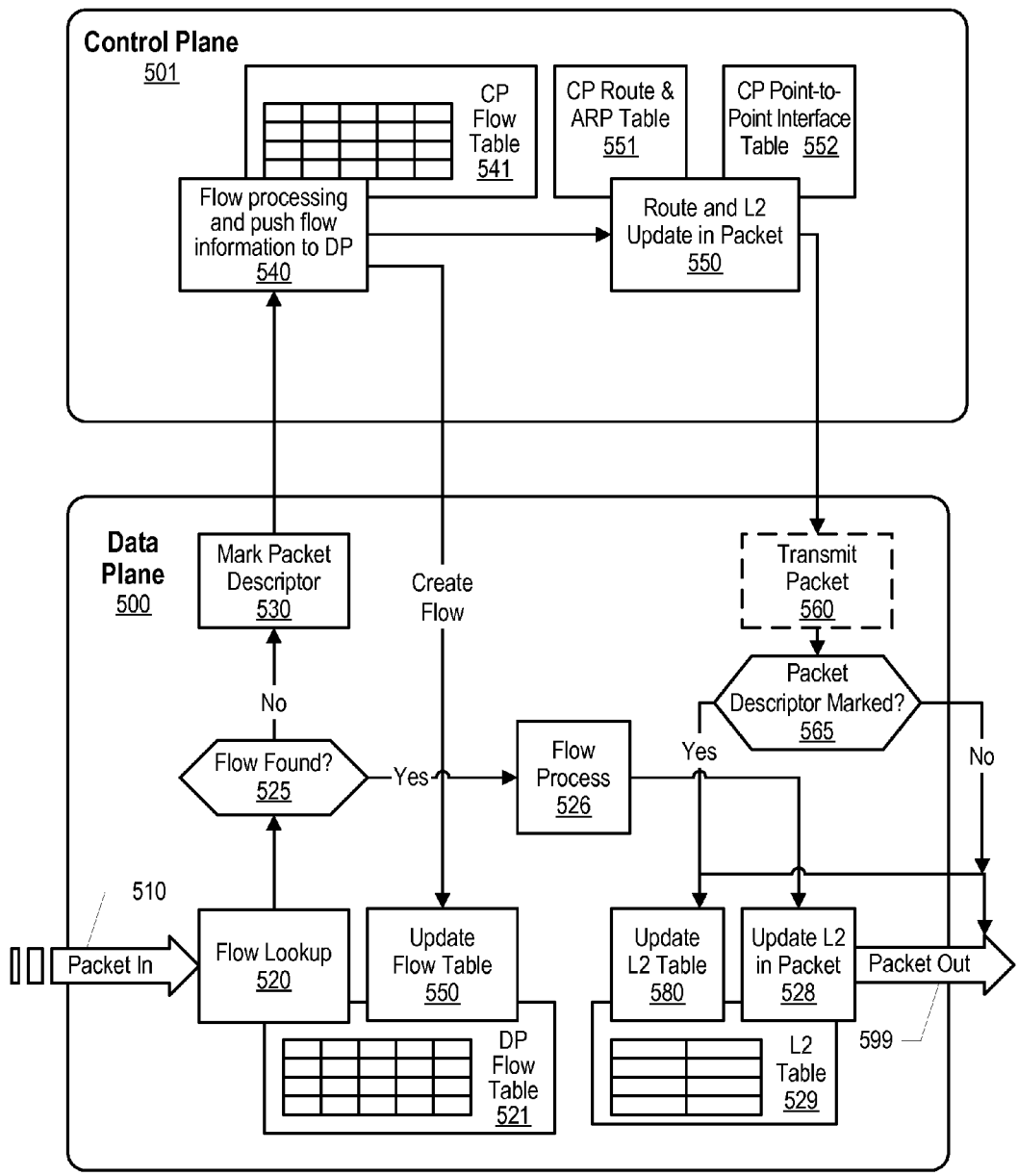
FIG. 5 is a diagram depicting interaction between a data plane and a control plan in a second embodiment.

FIG. 5 is a diagram depicting a second embodiment that shows the interaction between a data plane and a control plan in a second embodiment. FIG. 5 is similar to FIG. 3, however in FIG. 5 the flow table is updated by the control plane pushing flow information to the data plane rather than including the state data information in the packet descriptor, as explained below. As shown, the Data Plane acquires L2 header data from the Control Plane without using any explicit command/response mechanism between the planes.

Like FIG. 3, in FIG. 5 two planes, data plane 500 and control plane 501, work together to process incoming packet 510. Data plane 500, also known as the forwarding or fastpath plane, defines the part of the system (e.g., a router architecture, a data switch architecture, network appliance architecture etc.) that determines what to do with multiple incoming packets, including incoming packet 510. Flow lookup processing 520 is used to find a matching flow entry based on previously recorded information (e.g., five-tuple based TCP/IP connections, etc.). In one embodiment, flow table 521 is searched by flow lookup 520 with the flow table including five-tuple information that describe each bidirectional connection (e.g., TCP/IP, etc.). The five-tuple data is unique for each connection to allow data to go to and from the right devices. In one embodiment, the five-tuple includes five pieces of information that include the protocol type, the local address, the local port, the remote address, and the remote port.

A decision is made as to whether a flow entry was found in flow table 521 that matches incoming packet 510 (decision 525). If a flow entry was found in flow table 521 that matches the incoming packet, then decision 525 branches to the "yes" branch whereupon flow process 526 is performed. Flow process 526 processes the incoming packet as per the matching flow entry that was found in flow table 521. At step 528, the required L2 header data is written to the packet and then outgoing packet 599 is transmitted out to the destination over a communications network (e.g., the Internet, etc.).

On the other hand, if a flow entry was not found in flow table 521, then decision 525 branches to the "no" branch whereupon, at step 530, the packet is marked and sent to control plane 501 for further processing. In one embodiment, mark packet processing 530 inserts command data to the packet descriptor that is associated with the incoming packet. The marked packet is referred to as a marked ingress packet.

Control plane 501 receives the marked ingress packet and performs flow processing at 540 such as Firewall Policy lookup, Network Address Translation rule lookup etc., modifies the packet as per the matching policy & rule such as translating the IP and TCP/UDP header fields, and pushes the flow information to the data plane (flow table 521) using a command/response method known by those skilled in the art. The processing performed is, in one embodiment, based upon the command data inserted in the marked ingress packet. At 550, the control plane inserts state data into the packet forming a marked egress packet. In one embodiment, the control plane inserts state data by updating the L2 header data of the packet based on the interface on which the packet is to be transmitted. Control plane 501 then sends the marked egress packet back to data plane 500 for further processing and transmission.

Transmit function 560 identifies whether the packet is marked. A decision is made as to whether the packet received for transmission is marked (decision 565). If the packet is marked (a marked egress packet is being processed), then decision 565 branches to the "yes" branch whereupon process 580 is performed. At process 580, the L2 (L2) information is learned from the marked egress packet's state information and is used to update L2 Table 529. The packet descriptor is then removed from the packet forming egress packet 599 that is transmitted out to the destination over a communication network (e.g., the Internet, etc.). On the other hand, if the packet being processed by the data plane is not a marked packet, then decision 565 branches to the "no" branch whereupon outgoing packet 599 is transmitted to the destination over the communications network without the need to update the L2 Table.

Figure 6:
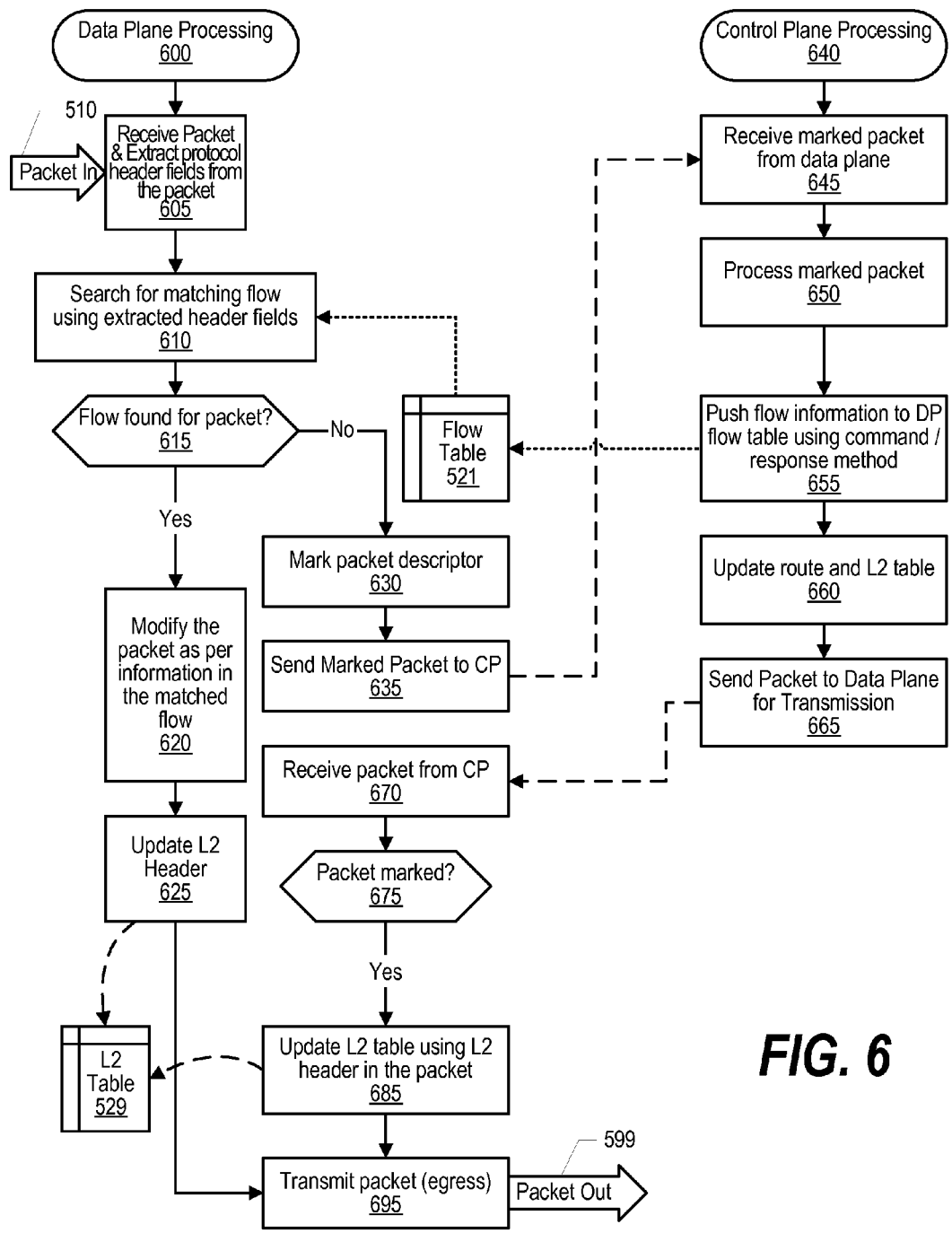
FIG. 6 is a flowchart showing steps performed by the data plane and the control plane in the second embodiment.

FIG. 6 is a flowchart showing steps performed by the data plane and the control plane in the second embodiment. FIG. 6 is a flowchart showing steps performed by the data plane and the control plane in the second embodiment. FIG. 6 depicts in a flowchart representation the processes shown in FIG. 5. FIG. 6 is similar to FIG. 4, however in FIG. 6 the flow table is updated by the control plane pushing flow information to the data plane rather than including the flow specific information in the packet and packet descriptor, as explained below.

Data plane processing commences at 600 whereupon, at step 605, a number of packets, including packet 510, are received at the data plane. At step 610, the data plane performs a flow lookup to find a matching flow entry in flow table 521. In one embodiment, the flow lookup is performed based on the five-tuple information discussed in FIG. 5.

A decision is made as to whether a flow table entry was found in flow table 521 that corresponds to incoming packet 510 (decision 615). If a flow table entry was found, then decision 615 branches to the "yes" branch whereupon, at step 620, the flow is processed by post flow lookup processing according to the information in the entry that was found in the flow table and, at step 625, the L2 header data in the packet is updated by inserting ("snapping") required L2 header data to the packet, before the packet is transmitted out (egress) to a destination over a communications network (e.g., the Internet, etc.).

Returning to decision 615, if a flow table entry was not found in flow table 521 that corresponds to incoming packet 510, then decision 615 branches to the "no" branch to process the packet. At step 630, the incoming packet is marked. In one embodiment, the marking includes inserting command data associated with the incoming packet thereby forming a marked ingress packet. At step 635, the marked ingress packet is forwarded to the control plane for further processing.

Control plane processing is shown commencing at 640 whereupon, at step 645, the marked ingress packet is received from the data plane. At step 650, the control plane processes the marked ingress packet and performs the necessary translation. At step 655, the control plane pushes flow information to the data plane flow table (flow table 521) using a command/response method known by those skilled in the art. At step 660, the control plane also updates the Layer 2 header of the marked ingress packet based on the interface on which the packet is to be transmitted. In one embodiment, the inclusion of state data is performed by having the control plane insert state data by updating the Layer 2 header of the marked egress packet based on the interface on which the packet is to be transmitted. At step 665, the marked egress packet is sent back to the data plane for further processing and transmission.

Continuing data plane processing, at step 670, the data plane receives the marked egress packet (with state data inserted therein) from the control plane. A decision is made as to whether the packet received from the control plane has been marked (decision 675). If the packet has been marked (indicating a marked egress packet), then decision 675 branches to the "yes" branch whereupon, at step 685, L2 table 529 is updated based on the state data inserted in the marked egress packet by the control plane. In addition, during step 685 the packet descriptor is removed from the marked egress packet forming egress packet 599 that, at step 695, is transmitted out to the destination address over a communications network (e.g., the Internet, etc.).

Figure 7:
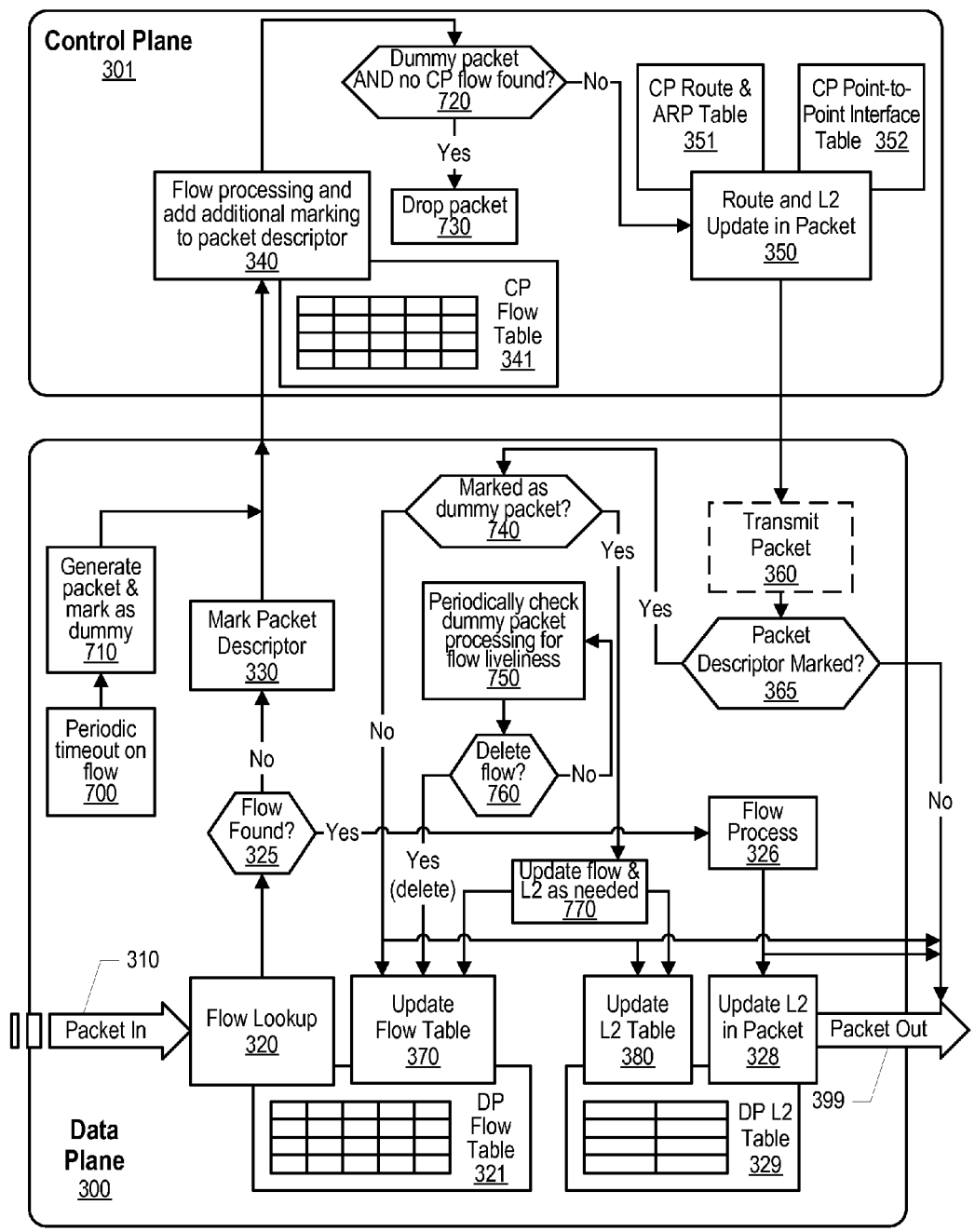
FIG. 7 is a flowchart showing steps performed by the data plane and the control plane in processing dummy packets.

FIG. 7 is a flowchart showing steps performed by the data plane and the control plane in the first embodiment in processing dummy packets. The elements with a 300 level number are described in conjunction with FIG. 3 above. Here, in FIG. 7, dummy packet processing is introduced shown with 700 level numbering (e.g., 700, 710, etc.).

In a traditional model of command/response, whenever the information in the flow and L2 header information is changed in the Control Plane (CP) due to change in the environment, 'modify' commands are sent to the Data Plane (DP) to update the existing flow and L2 table elements with new information. This new information includes flow attributes such as "Flow timeout" value, "Path MTU value" and L2 header attributes such as "new Egress port" or "New destination MAC address". In addition, in traditional models, the 'Delete' command is sent from the CP to the DP to indicate when the flow is terminated in the CP. In the command-less model described herein, dummy packets are used by the DP to learn the modified information in the flows and changed information in L2 headers as shown in FIG. 7. In addition, dummy packets are used by the DP to determine whether the flow continues to exist in the CP. In this manner, the approach avoids command based communication for create, delete and modify operations.

On per flow basis, the DP sends dummy packets periodically to the CP (module 700). Module 700 generates a packet and corresponding packet descriptor. Module 700 marks the packet descriptor indicating that the packet is a 'dummy packet' and module 700 also marks the packet descriptors with information as done for normal (non-dummy) packets. Module 700 uses the original packet information to create the packet content. The DP stores the at least one original packet information in the flow to facilitate creation of packet with the right headers. In one embodiment, the DP stores a copy of a truncated incoming packet in the DP flow for each flow being managed (either in DP flow table 321 or in a separate table) and uses this information to generate the dummy packets (module 710).

The DP stores the one packet worth of information based on original packets. This information is used to create the dummy packets using process 710. These dummy packets are sent to the CP for processing. During process 710, packet descriptors of each dummy packet are specially marked indicating that these are dummy packets.

The CP receives the packets, similar to original (non-dummy) packets at process 340. At CP process 340, the CP flow processing module adds flow information to the packet descriptor as it does for original packets. If there is no flow exists in the CP, the CP flow processing module is expected to drop these dummy packets at step 730. At process 350, Route & L2 Update module inserts the L2 header information in the packet and then the CP sends the packet to the DP for transmission similar to what it does for normal packets. In other words, the CP does not distinguish the dummy packets from normal original (non-dummy) packets.

The DP, as part of its transmit module 360, checks the marking, finds that the packet descriptor is marked (decision 365 branching to the "yes" branch) and then finds that the packet is a dummy packet using decision 740.

When a dummy packet is identified, decision 740 branches to the "yes" branch whereupon, at module 770, the DP checks the packet descriptor flow content with the content of the flow it has. If different, it updates the flow content with new information. Similarly, at step 770, the DP checks the L2 header in the dummy packet with the information in the L2 entry of L2 table. If different, the DP updates the L2 entry in L2 table 380. Dummy packets are not sent out as outgoing packet 399 as described in FIGS. 3 and 4.

In addition to revalidating and synchronizing the packet data as described above, the DP also uses the dummy packet mechanism to determine whether to keep the flows in the DP. Periodically, module 750 operates to check for stale flow entries. For each entry in flow table 321, the DP maintains the number of times the dummy packets are generated. If no dummy packets are received at 'Transmit' block 360 of the DP continuously for a given number of dummy packets, then the DP assumes that the CP is no longer processing the corresponding flow and, as a result, the DP removes the flow from its table with decision 760 branching to the "yes" branch.

As described above, the update of flow or L2 header entries with new information from dummy packet occurs in a similar manner as performed for any marked (non-dummy) packets as described in FIGS. 3 and 4. However, in the case of dummy packets, after updating the flow and L2 table, the DP checks whether the market packet is a dummy or a normal packet. If the packet is a dummy packet, it gets dropped (discarded) by the DP, while if the packet is a normal packet, the packet is sent out.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method to handle information packets comprising:
   receiving an incoming packet at a data plane at a network data handling apparatus;
   extracting packet data from the incoming packet;
   matching a plurality of flows from a flow data store with the extracted packet data;
   marking a packet descriptor data associated with the incoming packet, the marking forming a marked ingress packet, wherein the marking is performed in response to the matching failing to find a matching flow;
   forwarding the marked ingress packet to a control plane at the network data handling apparatus;
   retrieving a flow-related data related to the marked ingress packet at the control plane;
   updating, by the control plane, the packet descriptor data included in the marked ingress packet using the flow-related data, the updating forming an updated marked packet; and
   sending the updated marked packet back to the data plane, wherein the data plane processes the updated marked packet utilizing the flow-related data from the updated marked packet.

2. The computer-implemented method of claim 1 further comprising:
   creating, by the data plane, one or more entries in the flow data store using the flow-related data from the updated marked.

3. The computer-implemented method of claim 1 further comprising:
   updating, by the control plane, L2 header data into a header portion of the updated marked packet;
   snooping, by the data plane, the L2 header data that was updated by the control plane that is passed back to the data plane; and
   based on the snooping, updating an L2 table that is managed by the data plane using the L2 header that was updated by the control plane.

4. The computer-implemented method of claim 1 further comprising:
   sending a plurality of dummy packets from the data plane to the control plane, wherein each of the plurality of dummy packets relate to one of the plurality of flows from the flow data store;
   updating, by the control plane, the packet descriptor data of the plurality of dummy packets with the flow-related data;
   updating, by the control plane, L2 header data into a header that is included in each of the plurality of dummy packets;
   sending, by control plane, the updated plurality of dummy packets to the data plane;
   identifying, at the data plane, the updated marked packet as being one of the plurality of dummy packets;
   updating an L2 table that is managed by the data plane using the L2 header that was updated in the updated marked dummy packet; and
   discarding the updated marked packet after the updating of the L2 table.

5. The computer-implemented method of claim 4 further comprising:
   storing a truncated copy of the incoming packet and associating the truncated copy with one of the plurality of flows from the flow data store, wherein a plurality of truncated copies are stored corresponding to a plurality of incoming packets, wherein each of the plurality of truncated copies is associated with a different one of the plurality of flows from the data store; and
   generating the plurality of dummy packets from the plurality of truncated copies.

6. The computer-implemented method of claim 1 further comprising:

generating a plurality of dummy packets based on a plurality of previously received incoming packets, wherein each of the dummy packets relate to one of the plurality of flows from the flow data store;

sending the plurality of dummy packets from the data plane to the control plane;

identifying one or more dummy packets where a corresponding updated marked packet was not received at the data plane; and deleting, at the data plane, one or more of the plurality of flows from the flow data store corresponding to the identified one or more dummy packets.

7. The computer-implemented method of claim 1 further comprising:

periodically generating a plurality of dummy packets based on a plurality of previously received incoming packets, wherein each of the dummy packets relate to one of the plurality of flows from the flow data store;

sending the plurality of dummy packets from the data plane to the control plane;

identifying, at the data plane, the updated marked packet as being one of the dummy packets;

validating the matching flow in the flow data store using the flow-related data; and validating L2 header data stored in an L2 Table with a L2 header that is included in the updated marked packet.

8. The computer-implemented method of claim 7 further comprising:

updating one or more of the plurality of flows in the flow data store using the flow-related data; and updating the L2 header data stored in the L2 Table with the L2 header that is included in the updated marked packet.

9. A system comprising:

one or more processors;

a memory accessible by at least one of the processors, wherein a first set of the memory is allocated to a data plane that is executed by one or more of the processors and wherein a second set of the memory is allocated to a control plane that is executed by one or more of the processors;

a network adapter, accessible by at least one of the processors, that connects the system to a computer network;

a set of instructions stored in the memory and executed by at least one of the processors in order to perform actions comprising:

receiving, at the network adapter, an incoming packet at the data plane;

extracting packet data from the incoming packet;

matching a plurality of flows from a flow data store with the extracted packet data, wherein the flow data store resides in the first set of memory;

marking a packet descriptor data associated with the incoming packet, the marking forming a marked ingress packet, wherein the marking is performed in response to the matching failing to find a matching flow;

forwarding the marked ingress packet to the control plane, the forwarding including storing the marked ingress packet in the second set of memory;

retrieving a flow-related data related to the marked ingress packet at the control plane, wherein the flow-related data is retrieved from the second set of memory;

updating, by the control plane, the packet descriptor data included in the marked ingress packet using the flow-related data, the updating forming an updated marked packet; and sending the updated marked packet back to the data plane, wherein the data plane processes the updated marked packet utilizing the flow-related data from the updated marked packet.

10. The system of claim 9 wherein the set of instructions perform further actions comprising:

creating, by the data plane, one or more entries in the flow data store using the flow-related data from the updated marked packet.

11. The system of claim 9 wherein the set of instructions perform further actions comprising:

updating, by the control plane, L2 header data into a header portion of the updated marked packet;

snooping, by the data plane, the L2 header data that was updated by the control plane that is passed back to the data plane; and based on the snooping, updating an L2 table that is managed by the data plane using the L2 header that was updated by the control plane.

12. The system of claim 9 wherein the set of instructions perform further actions comprising:

sending a plurality of dummy packets from the data plane to the control plane, wherein each of the plurality of dummy packets relate to one of the plurality of flows from the flow data store;

updating, by the control plane, the packet descriptor data of the plurality of dummy packets with the flow-related data;

updating, by the control plane, L2 header data into a header that is included in each of the plurality of dummy packets;

sending, by control plane, the updated plurality of dummy packets to the data plane;

identifying, at the data plane, the updated marked packet as being one of the plurality of dummy packets;

updating an L2 table that is managed by the data plane using the L2 header that was updated in the updated marked dummy packet; and discarding the updated marked packet after the updating of the L2 table.

13. The system of claim 12 wherein the set of instructions perform further actions comprising:

storing a truncated copy of the incoming packet and associating the truncated copy with one of the plurality of flows from the flow data store, wherein a plurality of truncated copies are stored corresponding to a plurality of incoming packets, wherein each of the plurality of truncated copies is associated with a different one of the plurality of flows from the data store; and generating the plurality of dummy packets from the plurality of truncated copies.

14. The system of claim 9 wherein the set of instructions perform further actions comprising:

periodically generating a plurality of dummy packets based on a plurality of previously received incoming packets, wherein each of the dummy packets relate to one of the plurality of flows from the flow data store;

sending the plurality of dummy packets from the data plane to the control plane;

identifying one or more dummy packets where a corresponding updated marked packet was not received at the data plane; and deleting, at the data plane, one or more of the plurality of flows from the flow data store corresponding to the identified one or more dummy packets.

15. The system of claim 9 wherein the set of instructions perform further actions comprising:

periodically generating a plurality of dummy packets based on a plurality of previously received incoming packets, wherein each of the dummy packets relate to one of the plurality of flows from the flow data store;

sending the plurality of dummy packets from the data plane to the control plane;

identifying, at the data plane, the updated marked packet as being one of the dummy packets;

validating the matching flow in the flow data store using the flow-related data; and validating L2 header data stored in an L2 Table with a L2 header that is included in the updated marked packet.

16. The system of claim 15 wherein the set of instructions perform further actions comprising:

updating one or more of the plurality of flows in the flow data store using the flow-related data; and updating the L2 header data stored in the L2 Table with the L2 header that is included in the updated marked packet.

17. A computer program product stored in a non-transitory computer readable medium, comprising functional descriptive material that, when executed by an information handling system, causes the information handling system to perform actions comprising:

receiving an incoming packet at a data plane;

extracting packet data from the incoming packet;

matching a plurality of flows from a flow data store with the extracted packet data;

marking a packet descriptor data associated with the incoming packet, the marking forming a marked ingress packet, wherein the marking is performed in response to the matching failing to find a matching flow;

forwarding the marked ingress packet to a control plane;

retrieving a flow-related data related to the marked ingress packet at the control plane;

updating, by the control plane, the packet descriptor data included in the marked ingress packet using the flow-related data, the updating forming an updated marked packet; and sending the updated marked packet back to the data plane, wherein the data plane processes the updated marked packet utilizing the flow-related data from the updated marked packet.

18. The computer program product of claim 17 wherein the information handling system performs further actions comprising:

creating, by the data plane, one or more entries in the flow data store using the flow-related data from the updated marked packet;

updating, by the control plane, L2 header data into a header portion of the updated marked packet;

snooping, by the data plane, the L2 header data that was updated by the control plane that is passed back to the data plane; and based on the snooping, updating an L2 table that is managed by the data plane using the L2 header that was updated by the control plane.

19. The computer program product of claim 17 wherein the information handling system performs further actions comprising:

storing a truncated copy of the incoming packet and associating the truncated copy with one of the plurality of flows from the flow data store, wherein a plurality of truncated copies are stored corresponding to a plurality of incoming packets, wherein each of the plurality of truncated copies is associated with a different one of the plurality of flows from the data store;

generating a plurality of dummy packets from the plurality of truncated copies;

sending the plurality of dummy packets from the data plane to the control plane, wherein each of the plurality of dummy packets relate to one of the plurality of flows from the flow data store;

updating, by the control plane, the packet descriptor data of the plurality of dummy packets with the control plane flow information;

updating, by the control plane, L2 header data into a header that is included in each of the plurality of dummy packets;

sending, by control plane, the updated plurality of dummy packets to the data plane;

identifying, at the data plane, the updated marked packet as being one of the plurality of dummy packets;

updating the L2 table that is managed by the data plane using the L2 header data that was updated in the updated marked packet; and discarding the updated marked packet after the updating of the L2 table.

20. The computer program product of claim 17 wherein the information handling system performs further actions comprising:

generating a plurality of dummy packets based on a plurality of previously received incoming packets, wherein each of the plurality of dummy packets relate to one of the plurality of flows from the flow data store;

sending the plurality of dummy packets from the data plane to the control plane;

identifying one or more dummy packets where a corresponding updated marked packet was not received at the data plane; and deleting, at the data plane, one or more of the plurality of flows from the flow data store corresponding to the identified one or more dummy packets.

* * * * *